Nov. 5, 1968    L. F. JEZEK, JR    3,408,800
COTTON STRIPPING FINGERS
Filed April 26, 1965    2 Sheets-Sheet 1
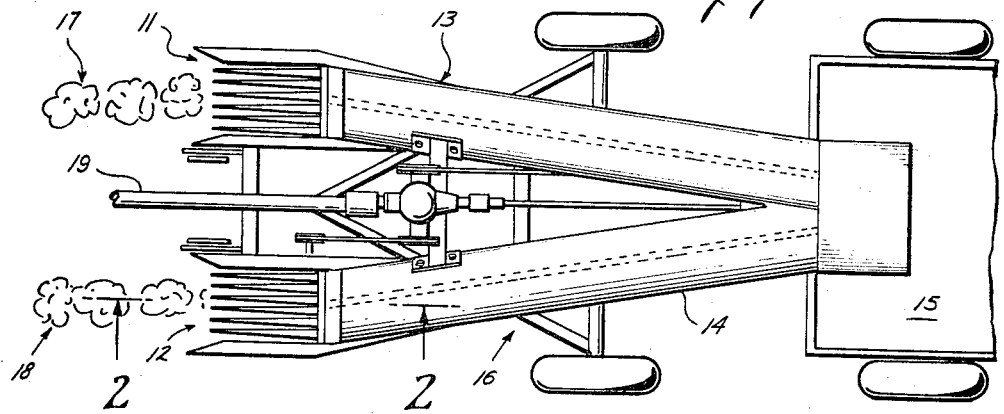
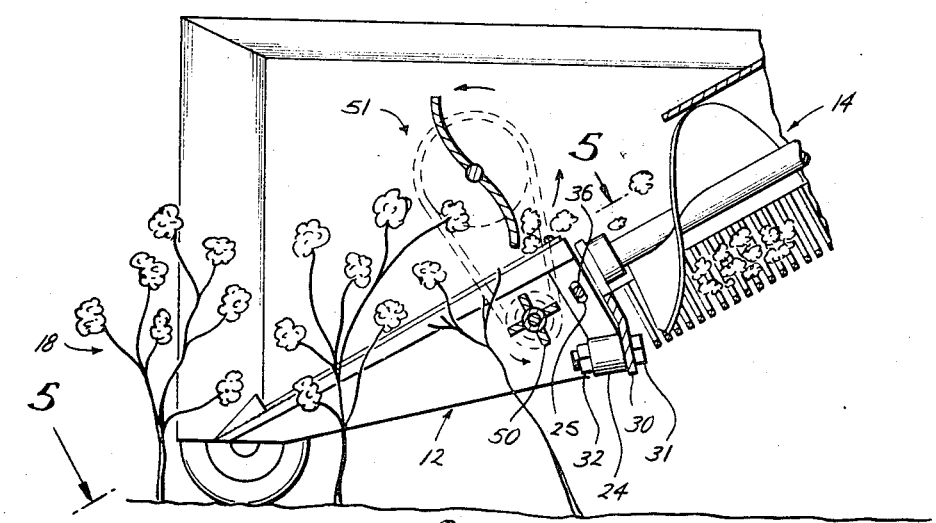
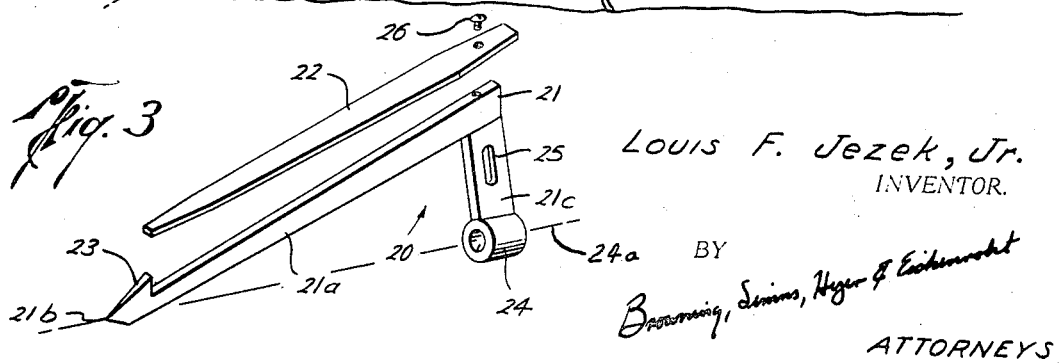
Louis F. Jezek, Jr.
INVENTOR.
BY
Browning, Simms, Hyer & Eichenroht
ATTORNEYS

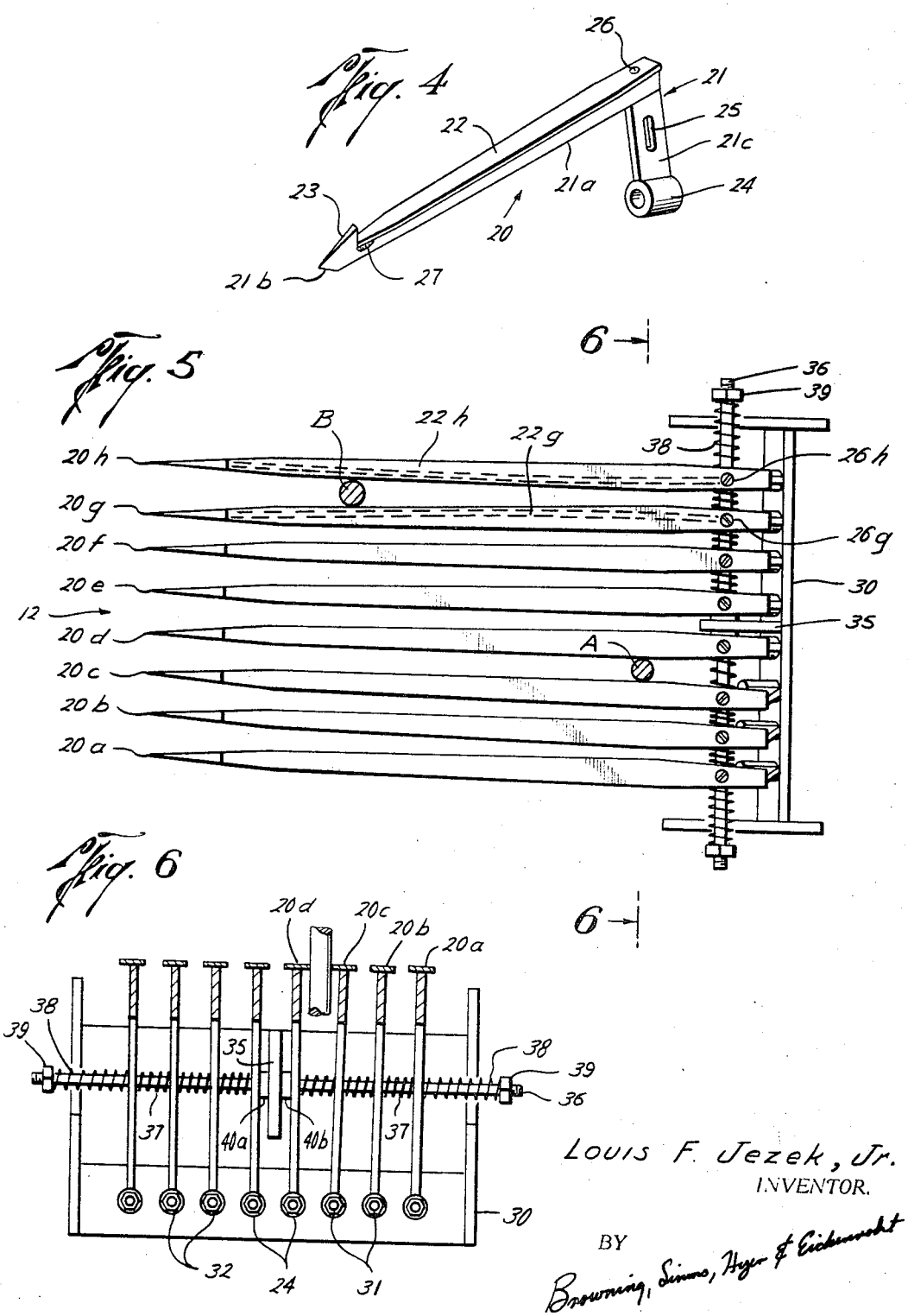

United States Patent Office 3,408,800
Patented Nov. 5, 1968

3,408,800
COTTON STRIPPING FINGERS
Louis F. Jezek, Jr., Rte. 3, Box 204,
Temple, Tex. 76501
Filed Apr. 26, 1965, Ser. No. 450,991
11 Claims. (Cl. 56—34)

ABSTRACT OF THE DISCLOSURE

Cotton stripping fingers are mounted on a vehicle in spaced, side-by-side, parallel relationship to comb the bolls from cotton stalks through which the fingers are moved. The fingers are L-shaped. Each has a stripping leg inclined downwardly in the direction of travel of the vehicle and a mounting leg for mounting the finger on a vehicle. Each finger is mounted for pivotal movement around an axis that extends in the direction of travel of the vehicle and intersects the front end of the stripping leg. This allows two adjacent legs to pivot and move apart as a large cotton stalk passes between them without increasing the space between their front any longer than is required for the stalk to pass between their front ends. A vertical mounting plate extends between the middle two fingers. An elongated rod extends transverse the fingers through the mounting legs and the mounting plate and is movable axially relative to the fingers and the plate. A coil spring is located between each two adjacent fingers except the two between which the mounting plate extends. These springs resiliently hold the fingers apart. Two additional coil springs are supported on the rod, each being located on one end of the rod outside the fingers. The spacer springs have a higher spring rate than the outside springs so that the outside finger of any two adjacent pairs on each side of the mounting plate will do most of the moving, when the two fingers are forced apart by the cotton stalk.

---

This invention relates to cotton strippers generally, and in particular to improved cotton stripping apparatus of the type that employs a plurality of teeth to comb or strip the bolls from the cotton stalks.

In cotton strippers of the type to which this invention relates, a plurality of fingers are arranged in parallel, spaced, relationship, much like the teeth of a comb. The fingers are moved through the cotton to strip or comb the bolls from the cotton as the cotton stalks move through the spaces between the fingers. Preferably, the fingers are spaced apart such that the fingers will strip the bolls efficiently but not such that the stalks will jam between the fingers and be pulled from the ground. For when the latter occurs, the fingers between which the stalk or stalks are located cannot efficiently strip cotton again until the jammed stalks have been removed. Each time this occurs then, the work must be stopped and the jammed stalk or stalks removed, if the fingers are to function at their maximum efficiency.

Thus, it is very important to have the proper spacing between the fingers. This spacing, of course, changes as the cotton harvesting conditions change and these change from field to field and between different areas of the same field as changes occur in the density and size of the cotton plants encountered, as well as the number and size of the weeds in the cotton.

Therefore, there is a need for cotton stripping apparatus having fingers for combing the cotton, to strip the bolls therefrom, that can automatically adjust the spacing between the fingers to accommodate changing harvesting conditions and it is an object of this invention to provide such apparatus.

It is another object of this invention to provide a cotton stripping apparatus having spaced fingers, between which the cotton stalks pass to have the bolls stripped therefrom, that can move apart as required to accommodate different sizes of cotton stalks.

It is another object of this invention to provide cotton stripping apparatus having a plurality of cotton stripping fingers that can be flexed sufficiently by the cotton stalks they encounter for their forward ends to thread their way through the cotton causing a minimum damage thereto while directing the cotton into the spaces between the fingers.

It is yet aonther object of this invention to provide cotton stripping apparatus having a plurality of cotton stripping fingers that are so mounted that the space between any two fingers toward the back end of the fingers can automatically increase to pass an extra large diameter cotton stalk without causing a substantial change in the space between the forward ends of the fingers.

These and other objects, advantages, and features of the invention will be apparent to those skilled in the art from a consideration of this specification and attached drawings.

In accordance with this invention a plurality of cotton stripping fingers are mounted on a vehicle in spaced, parallel, relationship and extending in the direction of travel of the vehicle. The fingers are mounted so they will pass through the cotton as the vehicle moves through the field and comb or strip the bolls from the cotton stalks. To accommodate varying numbers and/or sizes of stalks passing between the fingers, each finger is mounted for movement laterally of its direction of travel to vary the space between the fingers as required. Means, which in the preferred embodiment include a plurality of coil springs, are provided to hold the fingers spaced apart to receive the cotton stalks and resilient means are provided to hold the fingers against the holding means so the fingers can move laterally apart to increase the space between the fingers automatically as required by changing cotton harvesting conditions.

In the preferred embodiment, the fingers are generally L-shaped, each having a first elongated stripping leg and a second leg mounted at its outer end to pivot around an axis that extends in the same direction as the first finger which is the direction of travel of the fingers. By arranging the fingers so their axes of rotation, when extended, pass through or adjacent to the outer ends of their stripping legs, the spacing between the ends of adjacent fingers will tend to be substantially unchanged by the pivoting of the fingers laterally apart. This allows the forward ends of the fingers to remain in position to divide the cotton stalks more or less equally between the spaces between the fingers.

The invention will now be described in detail in connection with the attached drawings, in which:

FIG. 1 is a top plan view of a cotton stripper of the type to which this invention relates having cotton stripping fingers mounted thereon in accordance with the preferred embodiment of this invention;

FIG. 2 is a vertical cross sectional view along line 2—2 of FIG. 1;

FIG. 3 is an exploded isometric view of the preferred embodiment of one of the cotton stripping fingers;

FIG. 4 is an isometric view of the finger of FIG. 3 after it has been assembled;

FIG. 5 is a top plan view of a plurality of the cotton stripping fingers of FIG. 4 assembled in accordance with this invention; and FIG. 6 is a cross sectional view through the assembled fingers of FIG. 5 taken along line 6—6 and looking in the direction of the arrows.

FIG. 1 shows a cotton stripper arranged to strip two rows of cotton at a time. It includes cotton stripping finger assemblies 11 and 12 for stripping the bolls from the cotton, bin or hopper 15 for collecting the stripped bolls, and means for conveying the bolls after they are stripped from the cotton to the collecting bin comprising screw conveyors 13 and 14. All of this apparatus is mounted on vehicle 16 to be moved along cotton rows 17 and 18. The cotton stripper shown is designed to be pulled by a tractor (not shown) and powered through power take-off shaft 19 that is driven by the tractor. The power take-off shaft drives the screw conveyors, an air blower (not shown) that is used to blow the bolls into hopper 15 from the end of the conveyors, and other items that will be described below.

Cotton stripping finger assemblies 11 and 12 are identical so only one will be described in detail. These assemblies include a plurality of cotton stripping fingers 20, the preferred embodiment of which is shown in FIGS. 3 and 4. Each finger includes finger body 21 and finger stripping plate 22. Finger body 21 is generally L-shaped having a first stripping leg 21a and a second or mounting leg 21c. Each leg is made from relatively thin flat plate. The stripping leg diminishes outwardly in vertical thickness to provide a relatively sharply pointed forward end 21b. Preferably, this leg is elongated and made of a resilient material, such as steel, so that it will have considerable flexibility. Lug 23 is integrally attached to the upper surface of the leg adjacent end 21b to help hold any stripped cotton bolls that fall forward until the next stalk enters and carries the bolls upwardly toward the screw conveyors.

Attached to the end of the second or mounting leg 21c of the finger is mounting hub 24, which provides a bearing for pivotally mounting the finger on the stripper. Elongated opening 25 is located in the leg above the hub and will be utilized in a manner to be described below to hold the finger a predetermined minimum distance from its adjacent finger or fingers when it is assembled in a stripper.

As stated above, leg 21a of the finger, preferably, is long, made from a resilient material, and provided with a relatively sharp point. This gives the finger flexibility so it can be bent by the cotton stalks, sufficiently for the end of the finger to thread its way through the cotton, thereby reducing substantially the amount of cotton knocked down by the fingers. To have the desired flexibility, leg 21a is relatively thin, therefore, to reduce the number of fingers required to handle a given width of cotton, stripping plate 22 is mounted on the upper surface of leg 21a and extends laterally on each side thereof. It extends longitudinally along the leg from a point adjacent lug 23 rearward to the end thereof. The plate at its forward end is substantially the width of leg 21a. It widens out rapidly for a short distance then at a less rapid rate to combine with its adjacent plates to form a space of gradually diminishing width through which the cotton can move. Adjacent its rear end the plate tapers inward again.

To keep the plate from affecting the flexibility of leg 21a, only the ends of the plate are attached to the leg and at least one of its ends is pivotally attached. In the embodiment shown, the end of the plate adjacent lug 23 is attached to the finger body by weld 27 and the other end is attached by means of machine screw 26 around which it can rotate.

An additional feature of the finger is the relationship of centerline 24a of hub 24 to the forward end of the finger. As shown in FIG. 3, centerline 24a when extended intersects the end of the finger. As will be described below, this allows the finger to pivot around this centerline without causing any substantial lateral movement of the end of the finger relative to the centerline.

Cotton stripping finger assembly 12 shown in FIGS. 2, 5 and 6, includes a plurality of cotton stripping fingers, such as finger 20 described above, designated 20a–20h. Means are provided to mount the fingers in spaced, side-by-side, generally parallel, relationship with the cotton stripping portion thereof inclined downwardly in the direction of travel of the vehicle.

In the embodiment shown, mounting plate 30 is provided with a plurality of equally spaced holes (not shown) to receive bolts 31 which extend through hubs 24 on the mounting legs of the finger bodies. The hubs are held snugly in place on the bolts by nuts 32 but not so snugly as to hold the fingers against rotation on the bolts or for the bolts to rotate in the holes in the mounting plate. The bolts are all generally in alignment with the direction of travel of the vehicle, thus each finger can rotate or pivot laterally around an axis extending generally in the direction of travel of the finger.

Means are provided to hold the fingers spaced apart and means are provided to yieldingly hold the fingers against the spacing means to allow each two adjacent fingers to be moved laterally apart to increase the space therebetween as required to accommodate the cotton passing between the fingers, as the fingers are moved through the cotton by the vehicle. In the embodiment shown, rod 36 extends through the aligned, vertically elongated openings 25 in the mounting legs of the fingers. A plurality of coil springs 37 is slidably mounted on the rod and located between the fingers, as shown in FIG. 6 to hold the fingers apart. The outer end of rod 36 is threaded and coil springs 38 are located on each end between the outer fingers and nuts 39. These springs provide a resilient force to yieldingly hold the fingers against coil springs 37 and in an upright position.

To help hold the fingers in an upright position, and to reduce the effect on all of the fingers caused by an extra large cotton stalk, mounting plate 30 is provided with outwardly extending flange 35 which in this embodiment extends between fingers 20c and 20d. The flange has an opening (not shown) through which rod 36 extends and short solid spacers 40a and 40b are located between fingers 20c and 20d on opposite sides of the flange, as shown in FIG. 6. With this arrangement, the four fingers on one side of mounting plate 35 will remain substantially upright even though some or all of the fingers on the opposite side are moved laterally away from the flange by the cotton.

The flexibility and the ability of the fingers to automatically adjust the space between them as required to accommodate varying cotton harvesting conditions are illustrated in FIGS. 5 and 6. Cotton stalks A and B are shown passing between fingers 20c and 20d. Both stalks are larger in diameter than the spaces between the edges of the stripping plates on the fingers between which they are located. Stalk B is shown just after it has entered the space between fingers 20g and 20h. The stalk has flexed the stripping legs of the fingers as shown by the dashed lines to increase the space between them sufficiently to accommodate it. As the stripping legs flex the plates 22g and 22h pivot around machine screws 26g and 26h. This flexing force is exerted on the fingers on or near the axes of rotation of the fingers, since these axes intersect the ends of the fingers. Therefore, usually the fingers will flex rather than rotate to accommodate the stalks. Thus as shown in FIG. 5, the rear ends of fingers 20g and 20h have not moved laterally apart although the forward ends have separated by flexing to admit stalk B.

Stalk A, however, has moved between fingers 20c and 20d to a point near the back end of the space therebetween and the fingers 20d and 20c have automatically rotated on their shafts 31 and thereby moved apart at their rear ends to accommodate it. Finger 20d, of course, cannot move laterally to the left, as viewed in FIG. 6, because of solid spacer 40b and flange 35, so in this case finger 20c must do all the moving. It moves laterally by pivoting and compressing springs 37 and 38. All of the springs except the one between fingers 20c and 20d are subjected to the same force, theoretically. Due to friction, etc., however, the forces are not equally distributed and the springs on the right-hand side will be compressed more than those on the left-hand side. Also, preferably, spacing springs 37 have a higher spring rate than springs 38 so they will maintain the fingers spaced apart while transmitting the compressive force to the outside springs 38. Thus, as shown, even though the spacing spring between fingers 20a, 20b and 20c are compressed slightly by stalk A, most of the compression has occurred in springs 38. By adjusting nuts 39 the force required to move the fingers apart can be changed as required by the cotton harvesting conditions.

As fingers 20a, 20b and 20c are moved laterally to the right of finger 20d by stalk A, the outer or forward ends of the fingers tend to remain spaced substantially the same distance apart since the axes of rotation of all of the fingers intersect their forward ends. Thus, rotation of the fingers causes little, if any, lateral movement of their ends.

FIG. 2 shows cotton stripping finger assembly 12 combing the bolls from cotton row 18. Mounted below the fingers is cleaner rotor 50, which rotates in the counterclockwise direction as viewed in FIG. 2. It is the purpose of the cleaner rotor to help pull the cotton stalks downwardly from between the fingers as they approach the end of their travel therebetween, to pull the last bolls from the stalks and to reduce the tendency of the fingers to pull the stalks out of the ground. Mounted above the fingers is feeder rotor 51. It also rotates in a counterclockwise direction as viewed in FIG. 2. This rotor is positioned to help move the cotton bolls, after they have been pulled from the stalks, into screw conveyor 14 for movement to hopper 15. Rotors 50 and 51 are driven by the tractor through appropriate drive mechanisms.

From the foregoing, it will be seen that this invention is one well adapted to attain all of the ends and objects hereinabove set forth, together with other advantages which are obvious and which are inherent to the apparatus and structure.

The invention having been described, what is claimed is:

1. Apparatus for stripping the bolls from cotton plants, comprising, a plurality of at least three elongated stripping fingers, means for mounting the fingers on a vehicle to extend in the direction of travel of the vehicle in side-by-side, parallel, spaced relationship, each finger being mounted to pivot laterally of the direction of travel of the vehicle, around an axis extending generally in the direction of travel of the vehicle, means located between each two adjacent fingers for holding the fingers apart, and resilient means to yieldingly hold the fingers against the holding means to allow the fingers to move laterally as required to accommodate the cotton plants passing therebetween as the fingers are moved through the cotton.

2. The apparatus of claim 1 in which the holding means includes a plurality of coil springs positioned between the fingers.

3. Apparatus adapted to be moved through cotton by a vehicle to strip the bolls therefrom, comprising, a plurality of at least three elongated stripping fingers, means mounting the fingers in side-by-side, spaced relationship and for individual pivotal movement of each finger laterally from at least one of the fingers adjacent thereto to increase the space therebetween as required to accommodate the cotton as the fingers are moved through the cotton by the vehicle, and resilient means located between each finger and at least one adjacent finger for resiliently holding the fingers spaced apart and to permit one finger of each adjacent pair of fingers to pivot laterally away from said adjacent finger on one side by compressing the resilient means located on the side of said finger away from the adjacent finger.

4. In a machine for stripping bolls from cotton stalks, including a vehicle for moving through the cotton and conveyor means for moving the bolls stripped from the cotton to a collecting bin moving with the vehicle, the improvement, in combination therewith of a cotton stripping finger assembly mounted on the vehicle for movement through the cotton to comb the bolls from the stalks, said assembly comprising a plurality of at least three elongated stripping fingers, means mounting the fingers on the vehicle in parallel, spaced, relationship and inclined downwardly in the direction of travel of the vehicle, each finger being mounted for lateral movement relative to the direction of travel of the vehicle resilient means located between each finger and at least one adjacent finger for holding the fingers spaced apart to provide space between the fingers for the cotton stalks to enter to have bolls stripped therefrom as the fingers move through the cotton, and resilient means located on each side of the plurality of fingers for biasing the fingers toward the holding means to allow at least one of two adjacent fingers to move laterally away from the adjacent finger as required to accommodate the cotton stalks passing therebetween by compressing at least one of said resilient means located on the side of said finger toward which it is moved by the cotton stalks.

5. The machine of claim 4 in which the holding means includes a plurality of coil springs.

6. The machine according to claim 4 in which the fingers are generally L-shaped having a first leg inclined downwardly in the direction of travel of the vehicle and a second leg attached to the vehicle to pivot around an axis that extends generally in the direction of travel of the vehicle and intersects the longitudinal axis of the first leg adjacent its end to reduce substantially the lateral movement of the end of the first leg due to pivotal movement of the finger.

7. The machine according to claim 4 in which the fingers include an L-shaped finger body having a first leg inclined downwardly in the direction of travel of the vehicle, a second leg pivotally attached to the vehicle to allow the first leg to move laterally of the direction of travel, and an elongated stripping plate mounted on the upper surface of the first leg.

8. A cotton stripping finger for use with cotton stripping machines comprising and L-shaped finger body having amounting leg and a resilient stripping leg, a hub attached to the mounted leg having an opening to receive a shaft for pivotally mounting the finger to a cotton stripping machine, said opening being positioned with its centerline extending in the same directon as the stripping leg and intersecting said stripping leg adjacent its end, and an elongated stripping plate extending along and attached at opposite ends to the top of the stripping leg, said plate being pivotally attached to the stripping leg at at least one end to allow the stripping leg to be bent by the cotton.

9. Cotton stripping apparatus for moving through cotton, to strip the bolls therefrom, comprising a plurality of at least three L-shaped stripping fingers mounted on a vehicle in parallel side-by-side, spaced relationship, each of said fingers comprising an L-shaped finger body having an elongated first leg inclinded downwardly in the direction of travel of the vehicle and a second mounting leg extending rearwardly and downwardly from the first leg and pivotally attached to the vehicle to allow the first leg to move laterally of the direction of travel of the vehicle and an elongated stripping plate attached to the upper surface of the first leg and extending substantially its length, said plate being fixed to the leg only at its forward end to allow the elongated first leg to be flexed by the cotton stalks, a coil spring located between the mounting leg of each finger and the mounting leg of at least one adjacent finger to resiliently hold the two fingers from pivoting toward each other, and resilient means located on opposite sides of the plurality of fingers to engage the mounting legs of the two outside fingers and hold the fingers in engagement with the coil springs.

10. Cotton stripping apparatus for moving through cotton to strip the bolls therefrom comprising a plurality of L-shaped stripping fingers mounted on a vehicle in parallel, side-by-side, spaced relationship, each finger having a first leg inclined downwardly in the direction of travel of the vehicle and a second leg pivotally attached to the vehicle for pivotal movement around an axis extending in the direction of travel of the vehicle and adjacent the end of the first leg, means holding the fingers spaced apart to provide spaces between the fingers into which the cotton stalks can enter, said means including an elongated rod extending transverse the fingers, means mounting the rod on the vehicle for axial movement along a line spaced from the pivotal axes of the fingers, a plurality of spacers slidably mounted on the rod to engage the fingers and hold them apart, and resilient means mounted on the rod on opposite sides of the plurality of fingers to bias the fingers toward engagement with the spacers.

11. Apparatus for stripping cotton and the like, comprising, a plurality of at least three stripping fingers carried by a vehicle for movement through cotton by the vehicle, each of said fingers being generally L-shaped having a stripping leg and a mounting leg connected together, means for mounting the fingers on the vehicle in spaced, parallel relationship with their mounting legs extending generally upwardly and their stripping legs sloping downwardly generally in the direction of travel of the vehicle, each said mounting leg being mounted on the vehicle for pivotal movement around an axis that is spaced from and below the connection between the legs of the finger and that extends in the direction of travel of the vehicle and intersects the stripping leg adjacent its forward end to permit adjacent fingers to pivot laterally and move apart as required by cotton stalks passing rearwardly between them without substantially increasing the space between the forward ends of the stripping legs of said adjacent fingers, and means including resilient means for yieldingly holding the fingers in spaced relationship and against lateral movement.

References Cited

UNITED STATES PATENTS

| | | | |
|---|---|---|---|
| 1,368,014 | 2/1921 | Bauert et al. | 56—27 |
| 1,926,338 | 9/1933 | Johnson et al. | 56—14 |
| 3,067,561 | 12/1962 | Jezek | 56—34 |
| 3,108,416 | 10/1963 | Bopf et al. | 56—14 |

ABRAHAM G. STONE, *Primary Examiner.*

P. A. RAZZANO, *Assistant Examiner.*